Patented Oct. 8, 1935

2,016,426

UNITED STATES PATENT OFFICE 2,016,426

PURIFICATION OF PYRIDINE

Theodor Goost, Cologne-Mulheim, and Wilhelm Lommel, Leverkusen-Wiesdorf, Germany, assignors to I. G. Farbenindustrie Aktiengesellschaft, Frankfort-on-the-Main, Germany No Drawing. Application January 23, 1933, Serial No. 653,174. In Germany September 14, 1932

3 Claims. (Cl. 260—42)

This invention relates to the catalytic hydrogenation of pyridine and its homologues, more particularly it relates to a process of purifying pyridine and its homologues before hydrogenation takes place.

The catalytic hydrogenation of crude pyridine as known so far has caused difficulties on account of the impurities of unknown composition contained therein.

In accordance with the present invention it has been found that these pyridines can be brought into a readily hydrogenizable form when pretreating the same with a nitrogen compound containing an alkali forming metal, which is connected with the nitrogen atom in a non-ionizing linkage. As purification means, for instance, the potassium salt of phthalimide, calcium cyanamide and sodium amide can be applied. Many of these compounds act already at ordinary temperature or at a temperature being below the boiling point of the pyridine so that working can be performed without the use of pressure vessels.

The quantity of the purification means added may vary within wide limits, in general we prefer to work with about 2–10%.

The invention is further illustrated by the following examples without being restricted thereto:

Example 1

Dry pyridine which is obtained from coal tar is heated to about 100° C. together with 5% sodium cyanamide until a test portion is completely free from poison. The pyridine which is distilled off is stirred together with one of the usual nickel catalysts under superatmospheric pressure and at a temperature of about 200° C. Thereby it is smoothly converted into piperidine.

Example 2

100 parts by weight of crude dry pyridine are stirred together with 3 to 5 parts by weight of powdered sodium amide for several hours at ordinary temperature. The pyridine after the impurities have settled is taken off and is catalytically hydrogenized in the usual manner.

Example 3

Dry pyridine wherein 3% of potassium carbazolate are dissolved is distilled and the distillate is hydrogenized in the usual manner.

Instead of pyridine also its homologues may be employed. As purification means for instance the potassium salt of phthalimide, calcium cyanamide, potassium carbazolate, and sodium amide can be applied.

We claim:

1. Process which comprises purifying pyridine from such impurities as will prevent the hydrogenation of pyridine by contacting impure pyridine with about 2–10% of sodium cyanamide at about 100° C.

2. Process which comprises purifying pyridine from such impurities as will prevent the hydrogenation of pyridine by contacting impure pyridine with about 2–10% of sodium amide at ordinary temperature.

3. Process which comprises purifying pyridine from such impurities as will prevent the hydrogenation of pyridine by contacting impure pyridine with about 2–10% of a substance selected from the group consisting of alkali metal cyanamides, alkaline earth metal cyanamides and alkali metal amides at a temperature between ordinary temperature and the boiling point of pyridine.

THEODOR GOOST.
WILHELM LOMMEL.